July 17, 1956 R. J. MELCHER 2,755,331
CO-AXIAL CABLE FITTING
Filed Feb. 27, 1953 2 Sheets-Sheet 1
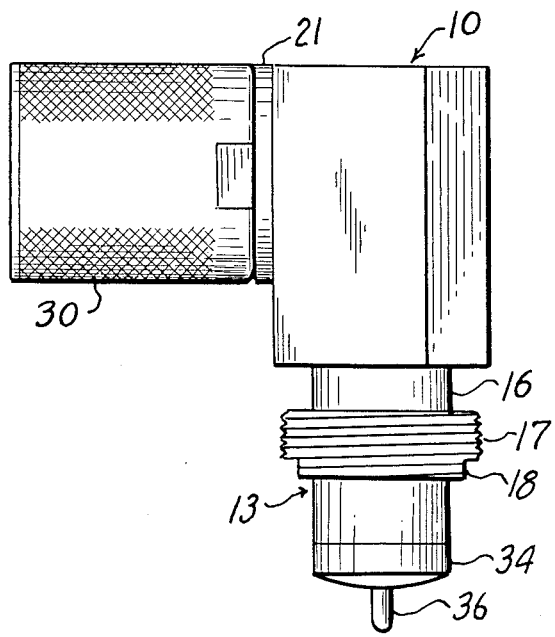
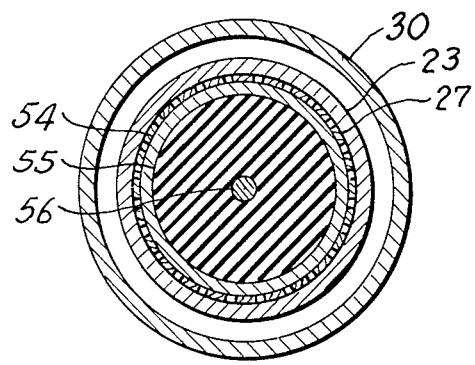
INVENTOR.
Robert J. Melcher
BY
Owen & Owen
ATTORNEYS

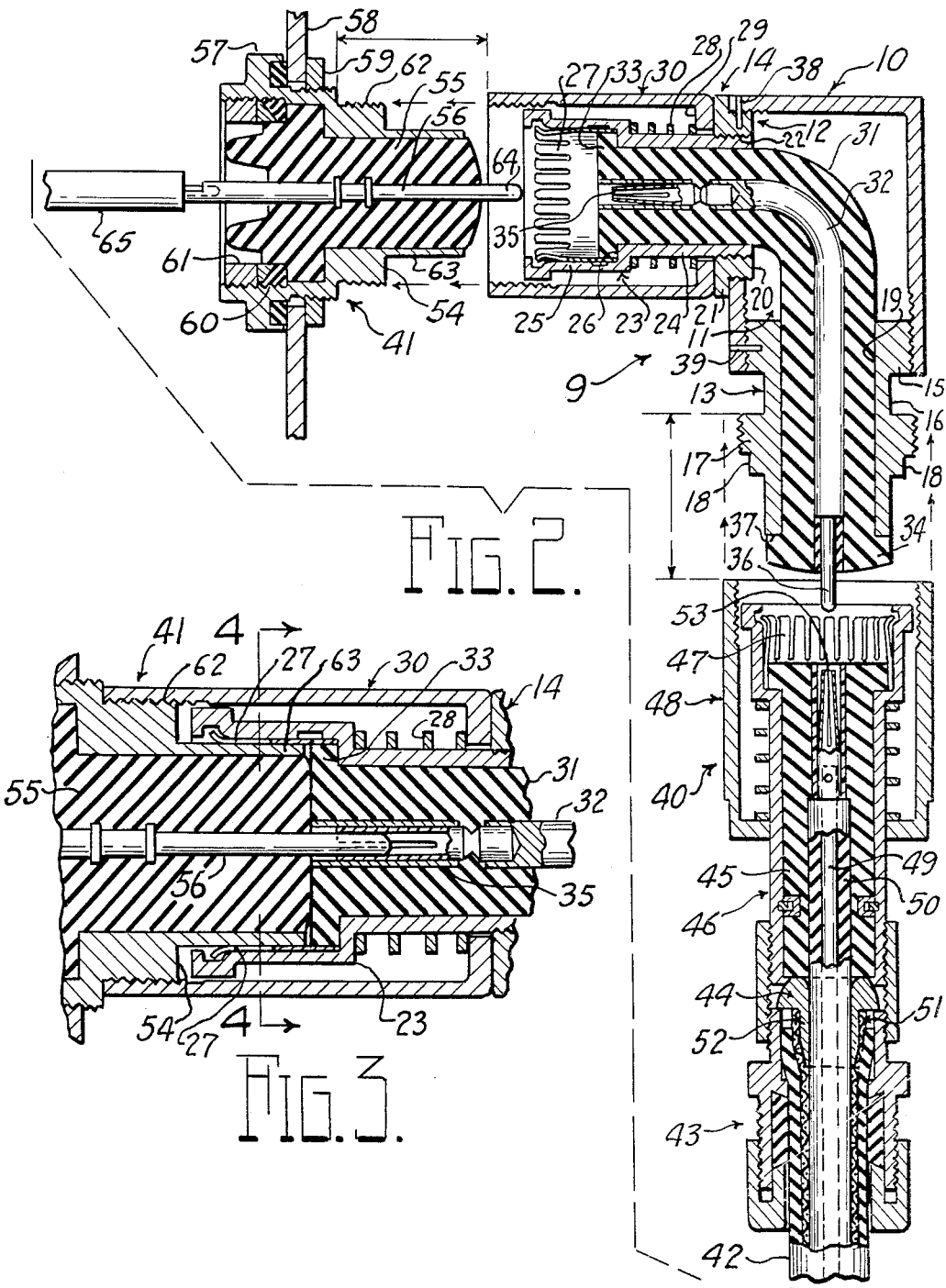

United States Patent Office 2,755,331
Patented July 17, 1956

2,755,331

CO-AXIAL CABLE FITTING

Robert J. Melcher, Toledo, Ohio, assignor to Erich P. Tileniur, Gerald L. Randolph, George A. Goss, John F. Jones, Jr., Toledo, Ohio, and John F. Jones, Sr., Plattsburg, N. Y., a copartnership doing business as H. H. Buggie and Company, Toledo, Ohio Application February 27, 1953, Serial No. 339,256

3 Claims. (Cl. 174—87)

This invention relates to co-axial cable fittings and, more particularly, to an adapter for co-axial cables designed to provide for angular connection of co-axial cables when desired without requiring that the cables be equipped with angularly shaped connectors.

Most co-axial cables are provided with connectors at one end and receptacles at the other end so that units of electrical or electronic apparatus can be connected one to the other with ease and rapidity. In some installations it is necessary that a connecting cable extend away from the instrument to which the connection is made in a direction parallel to the casing of the instrument rather than perpendicular to the casing, in other words, that the cable take a right angle turn adjacent its point of connection.

For the most part cables intended for use where such turns must be taken at the point of connection have been provided with connectors which in themselves accomplished the desired angular turn and in which the main portion of the cable actually was bent around the turn to be made. This form of construction has several disadvantages, among them being the requirements that the radius of curvature must be relatively large to prevent damaging the cable, that the fitting is a cable attachment and thus the end of the cable on which it is mounted is not usable where an angular connector is not desired and serious limitations are thus introduced into the flexibility of usefulness of a cable so equipped.

It is, therefore, the principal object of this invention to provide an adapter for co-axial cables which can merely be removably connected to the end of a cable provided with a standard co-axial fitting and in turn be removably connected to either a receptacle or a connector plug on another cable or on a piece of apparatus.

It is another object of this invention to provide an angular adapter for a co-axial cable which is substantially pressure and moisture-proof and which is easily and rapidly connectable and disengageable from cable connector plugs and receptacles.

Further and more specific objects of the invention will be better understood from the specification which follows and from the drawings, in which:

Fig. 1 is a view in elevation of a cable adapter embodying the invention.

Fig. 2 is a vertical sectional view of a cable adapter embodying the invention as employed with a co-axial connector plug for connecting a co-axial cable to the panel receptacle of electronic apparatus; the elements being shown in disconnected relationship.

Fig. 3 is a fragmentary vertical sectional view on an enlarged scale of portions of the apparatus illustrated in Fig. 2, in their assembled positions.

Fig. 4 is a vertical sectional view taken substantially on the line 4—4 of Fig. 3.

A cable adapter 9 embodying the invention has a housing 10 (Fig. 2) which has an open end 11 and a side opening 12. The walls of the open end 11 and side 12 are threaded for the reception of an elongated stem 13 and a short flanged collar 14, respectively. The stem 13 has a flange 15 having a threaded periphery engageable with the threads on the inner surface of the wall of the open end 11 of the housing 10, a neck 16 of reduced diameter and a second circular flange 17 which also is threaded on its exterior. The threaded flange 17 has flats 18 for the reception of a wrench, for example, for tightening the stem 13 in place. The stem 13 has a straigh axial bore 19 extending throughout its length.

The flanged collar 14 has a portion 20 of smaller diameter which is threaded on its exterior for engagement with the threads on the walls of the circular opening 12 of the housing 10 and rim 21 of larger diameter which bears against the exterior of the housing 10 when the collar 14 is tightened in place. The collar 14 is annular and has a threaded interior surface 22.

The threaded surface 22 receives one end of a tubular receptacle shell 23 having a hollow cylindrical rear section 24 and a cup shaped front section 25 of larger diameter. The receptacle shell 23 has an annular shoulder 26 at the junction between the rear section 24 and forward section 25 and is provided with an annular series of radial expansible contact fingers 27 located near the open end of the front section 25. A plurality of spring washers 28 surround the exterior of the rear section 24, bearing between the outer surface of the shoulder 26 and a rear lip 29 of a coupling nut 30. The coupling nut 30 extends exteriorly of the receptacle shell 23 and beyond the forward end of the forward section 25, being threaded at its forward interior edge.

An insulator sleeve 31 surrounds a right angle conductor 32, insulating the conductor 32 from the receptacle shell 23 and stem 13 and extending through the shell 23, the interior of the adapter housing 10 and the stem 13. The insulator 31 is molded from a relatively soft resilient material and has a radial lip 33 at its end inside the receptacle shell 23 and a lip 34 at the end which protrudes beyond the end of the stem 13. The end surface of the insulator 31 at the lip 33 is generally flat and normal to the axis of the receptacle shell 23 but the protruding end at the lip 34 is spherical in shape for a purpose which will be later explained.

The center conductor 32 is provided at each end with a connector pin, for example, the female socket 35 and the male pin 36.

The adapter 9 embodying the invention as illustrated in Fig. 2, is assembled as follows. The female socket 35 is soldered to the conductor 32 and molded into the insulator 31. The spring washers 28 and coupling 30 are placed on the exterior of the receptacle shell 23. The collar 14 is then screwed onto the receptacle shell 23 until the end of the portion 20 of the collar 14 and the end of rear section 24 of the receptacle shell 23 are flush. These two parts are then soldered or pinned together in this position.

The insulator assembly consisting of the conductor 32 and the insulator 31 is placed in its position through the housing 10. The insulator lip 33 is introduced into and pushed through the receptacle shell 23 from the smaller rear section 24. Although the lip 33 has a diameter greater than the interior diameter of the receptacle shell 23, it is flexible and thus can be deformed sufficiently to be forced through.

The receptacle assembly consisting of the receptacle shell 23, the spring washers 28, the coupling 30 and the collar 14 is then screwed into the housing 10 until positioned by the rim 21. The insulator assembly is positioned against the annular shoulder 26 of the shell 23 by means of the lip 33.

The stem 13 is then forced over the end of the insulator 31, the enlarged flange 34 being deformed to permit it to slide through the bore 19 in the stem 13. It will be observed in Fig. 2 that the threads on the interior of the open end 11 of the adapter housing 10 extend along the wall of the housing 10 a substantial distance beyond the flange 15 of the stem 13 in their finally assembled positions of Fig. 2. This extra section of threads permits the stem 13 to be threaded into the interior of the adapter housing 10 beyond the position shown in Fig. 2, which allows the flange 34 on the insulator 31 to extend through the stem 13 a distance sufficient to permit the flange 34 to pass beyond the end of the stem 13 and to reassume its form as shown in Figs. 1 and 2. The stem 13 is then backed out of the adapter housing 10 until the outer side of its flange 15 is flush with the open end 11 of the housing 10.

Small radially extending holes are then bored through the walls of the adapter housing 10 and into the portion 20 of the flanged collar 14 and into the flange 15 of the stem 13. Positioning pins 38 and 39 are then driven into these bored holes to lock the flanged collar 14 and stem 13 in position in the adapter housing 10.

An adapter 9 embodying the invention is designed for use with a connector plug 40 and panel receptacle 41 also shown in Fig. 2. The connector plug 40 and panel receptacle 41 are illustrated as being constructed according to my copending application Serial No. 336,289 filed February 11, 1953.

In general, the connector plug 40 comprises means for attaching the plug 40 to a co-axial cable 42 including cable clamping means 43, a cable shield connecting ferrule 44, a flexible insulator 45, a connector shell 46, shield contact fingers 47 and a coupling nut 48. The co-axial cable 42 has a central conductor 49 which is provided with an exterior layer of insulation 50 both of which are inserted from the rear into the interior of the tubular insulator 45. The co-axial cable 42 has a shield 51, usually in the form of a woven wire mesh, located just exteriorly of the layer of insulation 50. Electrical contact for the shield 51 is made by soldering or otherwise connecting it to a thin body portion 52 of the ferrule 44 and it is, in turn, electrically connected to the connector shell 46 by the ferrule 44.

The shield connector fingers 47 are outwardly flexible and of such size as to slide over the exterior of the flange 34 on the insulator 31 and the adjacent end 37 of the stem 13. The forward end of the connector plug coupling nut 48 is threaded for engagement with the threaded flange 17 on the stem 13. Engagement between the connector plug 40 and the adapter 9 embodying the invention is made by moving the connector plug 40 as indicated by the broken arrows in Fig. 2 to engage the threaded interior of the coupling nut 48 with the threads on the exterior of the flange 17. This also inserts the male connector pin 36 into a female connector pin 53 on the end of the central conductor 49 and in the insulator 45 of the connector plug 40 as well as engaging the fingers 47 with the exterior of the stem 13.

The panel receptacle 41 which is suitable for connection either to the connector plug 40 or to the adapter 9 embodying the invention comprises a generally tubular shell 54 having an interior plastic insulator 55 that surrounds a central conductor 56, the shell 54 also being provided with an appropriate flange 57 which bears against the interior side of a housing panel 58 and a locking nut 59 for securing the receptacle 41 in the panel 58. The insulator 55 is retained in the shell 54 by a sealing gasket 60 and locking nut 61. An enlarged portion of the shell 54 has a threaded surface 62 engageable by the threads on the interior of the coupling 30. By moving the adapter 9 embodying the invention axially onto the panel receptacle 41 and engaging the coupling 30 with the threaded portion 62 of the panel receptacle 41, contact is made between the fingers 27 of the adapter 9 and a cylindrical portion 63 of the shell 54 and between the female connector pin 35 and protruding end 64 of the central conductor 56 of the panel receptacle 41. The central conductor 56 of the panel receptacle 41 may be connected by a lead 65 to apparatus within the panel 58.

Fig. 3 illustrates how the matching parts of an adapter 9 embodying the invention and the panel receptacle 41 appear when in their assembled positions. It will be observed that when the coupling 30 is threaded fully onto the threaded portion 62 of the shell 54, the cylindrical portion 63 of the shell 54 enters completely into the expansible fingers 27. This establishes electrical contact between the shell 54 and thus the panel 58 of the apparatus and the receptacle shell 23 of the adapter 9 which in turn is electrically connected through the annular collar 14 to the adapter housing 10, the stem 13 and the fingers 47 of the connector plug and its elements to the shield 51 of the co-axial cable 42.

In Fig. 3 it will also be observed that the central conductor 56 of the panel receptacle 41 is engaged in the female connector pin 35 of the central conductor 32 of the adapter 9 embodying the invention.

As was earlier mentioned, the end of the insulator 31 at its flange 34 is spherical. Similarly the end of the insulator 55 of the panel receptacle 41 is also spherical. These spherical ends are brought into contact with the planar ends of the connector plug insulator 45 and the insulator 31 at the flange 33, respectively, when the connector plug 40 is assembled on the adapter 9 and the adapter 9 is assembled on the panel receptacle 41.

As can best be seen in Fig. 3, when the coupling nut (in this case the nut 30) is tightened the spherical end of the insulator (55) is forced into the planar surface of the insulator 31, "wiping" air out from between the mated surfaces of the insulators (31 and 55).

The cross sectional appearance of the assembled connector plug 40 and associated end of the adapter 9 embodying the invention is substantially the same as the appearance of the assembled parts of the panel receptacle 41 and the adapter 9 shown in Fig. 3.

In Fig. 4, a vertical sectional view of Fig. 3 on the line 4—4 thereof, the co-axial relationship of all of the assembled parts is most clearly shown with the central conductor 56 of the panel receptacle 41 surrounded by its elongated insulator 55 which is in turn enclosed within the shell 54 and the contacting fingers 27 of the adapter 9 embodying the invention circumjacent of the shell 54 and interior of the receptacle shell 23 of the adapter 9. The coupling 30 of the adapter 9 embodying the invention forms the exterior housing and enclosure for all of the assembled parts.

It is, of course, apparent that an adapter embodying the invention can be used in connection with a panel receptacle 41 having a female connector and a connector plug 40 having a male connector. In this case, the position of the adapter embodying the invention would simply be reversed with respect to the panel receptacle and connector plug. Similarly, the panel element might be a receptacle and the connector element a plug, rather than the reverse as shown in Fig. 2.

The adapter embodying the invention thus provides for the flexible connection of co-axial cables having straight connector plugs or receptacles of either the male or female type to receptacles or panel plugs with a 90° turn at the point of connection without limiting the connection of the cables under these circumstances. In other words, by reason of the design and utility of an adapter embodying the invention, connectors for co-axial cables may be attached not only by straight connection to receptacles but also by 90° connections without modification of the co-axial cables or their connector plugs. This is particularly advantageous where electronic elements in their waterproof and air-tight casings are separately portable and may be positioned differently relative to each other upon different occasions. The use of an adapter constructed according to the invention facilitates assembly of such elements regardless of their positions relative to each other. Its use eliminates the need for special right angle connectors on the ends of co-axial cables such as have been employed in the past.

An adapter embodying the invention has the additional important feature that it can be substantially smaller in overall size than a connector plug which embodies a 90° turn because the conductor and insulator 32 and 31 of the adapter embodying the invention can turn a much sharper corner than is possible with a shielded co-axial cable.

I claim:

1. An adapter for a co-axial cable comprising, in combination, a housing having at least two threaded openings leading therefrom in the directions of desired extent of the cable and the element to be connected thereto, a connector plug fitting threaded into one of said openings, a receptacle mount threaded into the other of said openings, said fitting and said mount both having axial bores, a conductor and a sleeve-like insulator therefor extending through the bores in said fitting and in said mount and through the interior of said housing, said insulator having a relatively thin radial flange at each end, the diameters of said flanges being larger than the diameters of the bores through which said insulator extends and the diameter of the main body of said insulator being substantially equal to the diameters of such bores, a male contact at one end of said conductor protruding beyond the flange at that end of said insulator and a female contact at the other end of said conductor located within said insulator, and a receptacle mounted on said receptacle mount and protruding axially therefrom for the reception of a co-axial cable type connector plug.

2. An adapter according to claim 1 in which at least one of the threaded openings in said housing has threads extending inwardly beyond the normal assembled engagement therewith of the threads on the element threaded therein whereby such element may be threaded beyond normal position into said housing and backed off to engage the corresponding flange on said insulator.

3. An adapter according to claim 2 in which the receptacle mount has a flange engageable with the outer wall of said housing and the connector plug fitting has a threaded flange engageable in its threaded opening in said housing and an axially adjacent outer neck section of diameter smaller than the diameter of such threaded opening.

References Cited in the file of this patent
UNITED STATES PATENTS

| | | |
|---|---|---|
| 2,335,041 | Bruno | Nov. 23, 1943 |
| 2,371,551 | Schmitt | Mar. 13, 1945 |
| 2,603,682 | Uline et al. | July 15, 1952 |